(12) United States Patent
Kaneyama et al.

(10) Patent No.: US 7,757,587 B2
(45) Date of Patent: *Jul. 20, 2010

(54) BOLT OR NUT TIGHTENING DEVICE

(75) Inventors: Yasunobu Kaneyama, Osaka (JP); Tatsuo Hirai, Osaka (JP)

(73) Assignee: Maeda Metal Industries, Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/924,109

(22) Filed: Oct. 25, 2007

(65) Prior Publication Data

US 2008/0098863 A1   May 1, 2008

(30) Foreign Application Priority Data

Oct. 30, 2006   (JP) .............................. 2006-293523

(51) Int. Cl.
*B25B 17/00* (2006.01)
*B25B 23/14* (2006.01)

(52) U.S. Cl. ....................................... 81/57.14; 81/467

(58) Field of Classification Search ................ 81/57.14, 81/55, 57.13, 57.3, 57.31, 57.22, 57.39, 467, 81/479

See application file for complete search history.

(56) References Cited

U.S. PATENT DOCUMENTS

| | | | |
|---|---|---|---|
| 5,383,370 A * | 1/1995 | Abramson et al. | 73/862.23 |
| 5,513,546 A * | 5/1996 | Ikeda et al. | 81/57.13 |
| 5,964,128 A * | 10/1999 | Kaneyama et al. | 81/57.22 |
| 6,971,567 B1 * | 12/2005 | Cannaliato et al. | 227/2 |
| 7,011,000 B2 * | 3/2006 | Kushida et al. | 81/467 |
| 7,036,703 B2 * | 5/2006 | Grazioli et al. | 227/10 |
| 7,182,147 B2 * | 2/2007 | Cutler et al. | 173/1 |
| 7,234,378 B2 * | 6/2007 | Reynertson, Jr. | 81/479 |
| 7,275,450 B2 | 10/2007 | Hirai et al. | |

* cited by examiner

*Primary Examiner*—Hadi Shakeri
(74) *Attorney, Agent, or Firm*—Eckert Seamans Cherin & Mellott, LLC; Kirk D. Houser, Esq.

(57) ABSTRACT

A bolt or nut tightening device has an outer shaft and an inner shaft rotatable in directions opposite to each other, the outer shaft having a reaction receiver projecting therefrom sideways, the inner shaft being provided with an engaging portion engageable with a bolt or nut to be tightened, the bolt or nut tightening device being provided on the outer shaft with a tightening torque measuring unit, which comprises a strain sensor, a circuit board, an indicator, a battery, and a case for accommodating the circuit board, the indicator and the battery, the case being attached to the outer shaft, projecting toward the same direction as the reaction receiver, and being so sized as to be hidden by a contour of the reaction receiver and so positioned as to be hidden behind the reaction receiver when seen from the forward end side of the engaging portion.

2 Claims, 9 Drawing Sheets

BOLT OR NUT TIGHTENING DEVICE

FIELD OF THE INVENTION

The present invention relates to bolt or nut tightening devices comprising the combination of a tightening assisting unit and input means coupled to the unit, the tightening assisting unit comprising a bolt or nut engaging portion, a reaction receiver and a tightening torque measuring unit.

BACKGROUND ART

The present applicant has previously proposed a bolt or nut tightening device which comprises a tightening torque measuring unit connected to the output shaft of a power tightening machine, and a socket having a reaction receiver and connected to the output shaft of the measuring unit (JP2006-21272A).

With proposed bolt or nut tightening device, the power tightening machine serving as input means can be an existing one, and the tightening torque measuring unit is adapted to indicate actual values of tightening torque.

The tightening torque measuring unit comprises a strain gauge provided on a tubular body connected to an outer output shaft of the power tightening machine coaxially therewith. The tubular body is externally provided with a circuit board for converting the amount of strain of the strain gauge to a corresponding amount of tightening torque, an indicator for indicating the amount of tightening torque and a battery. The circuit board, the indicator and battery are covered with a tubular casing coaxial with the tubular body.

To accommodate the circuit board, the indicator and the battery in an annular space inside the tubular casing around the tubular body, the casing needs to have a length and an inside diameter fully sufficient to position these components to be covered within the casing.

The tubular casing serves to protect the components of the tightening torque measuring unit and must have high rigidity for use in work environments such as work sites wherein the device is likely to collide with workpieces or to slip off from the hand to fall.

This gives the tightening torque measuring unit an increased outside diameter, a larger length and greater weight.

The tightening torque measuring unit itself has no reduction mechanism incorporated therein, so that large bolts or nuts to be tightened by controlling the tightening torque require an expensive power tightening machine of large size serving as input means and having a reduction mechanism for effecting a great reduction.

If a great tight torque measuring unit is connected to the power tightening machine of large size, the machine is not fully satisfactory in maneuverability and ease of use.

The torque indicator of the tightening torque measuring unit is adapted to indicate the digits of a numerical value as arranged axially of the tubular casing and therefore has the problem that it is difficult for the worker to read the values while operating the power tightening machine.

An object of the present invention is to provide a bolt or nut tightening device wherein use can be made of an existing inexpensive small power tightening machine or a manual wrench as input means and which can be prevented from becoming greater in outside diameter and length although including a planetary gear mechanism, the device being highly maneuverable and easy to use and having a tightening torque indicator which is easy to watch.

SUMMARY OF THE INVENTION

The present invention provides a bolt or nut tightening device which comprises the combination of a tightening assisting unit having an outer shaft and an inner shaft coupled to a planetary gear mechanism coaxially therewith and rotatable in directions opposite to each other, the outer shaft having a reaction receiver projecting therefrom sideways, the inner shaft being provided with an engaging portion engageable with a bolt or nut to be tightened, and input means coupled to the planetary gear mechanism. The outer shaft is provided with a tightening torque measuring unit, which comprises a strain gauge or like strain sensor provided on the outer shaft, a circuit board for converting the amount of strain of the outer shaft as detected by the strain sensor to an amount of tightening torque, an indicator for indicating the amount of tightening torque, a battery, and a case for accommodating the circuit board, the indicator and the battery, the case being attached to the outer shaft and projecting toward the same direction as the reaction receiver, the case being so sized as to be hidden by a contour of the reaction receiver and being so positioned as to be hidden behind the reaction receiver when seen from the forward end side of the engaging portion.

In the bolt or nut tightening device of the invention, the indicator is adapted to indicate digits of a numerical value as arranged preferably in the direction of projection of the case.

In the bolt or nut tightening device of the invention, the case is rotatable preferably about a rod orthogonal to an axis of the outer shaft.

According to an embodiment of bolt or nut tightening device of the invention, the input means is a power tightening machine having the two output shafts of an inner output shaft and an outer output shaft coaxial therewith, and an input receiver provided in the tightening assisting unit has a first connecting member for detachably connecting the outer shaft of the tightening assisting unit to the outer output shaft of the power tightening machine so as to be rotatable therewith, and a second connecting member for detachably connecting an input shaft of a system for rotatingly driving the engaging portion of the tightening assisting unit to the inner output shaft (98) of the power tightening machine so as to be rotatable therewith.

According to another embodiment of bolt or nut tightening device of the invention, the input means is a power tightening machine having a single output shaft, and an input receiver provided in the tightening assisting unit has a connecting member for detachably connecting an input shaft of a system for rotatingly driving the engaging portion of the tightening assisting unit to the output shaft of the power tightening machine so as to be rotatable therewith.

According to another embodiment of bolt or nut tightening device of the invention, the input means is a manual wrench, and an input receiver provided in the tightening assisting unit has a connecting member for detachably connecting an input shaft of a system for rotatingly driving the engaging portion of the tightening assisting unit to an output shaft of the manual wrench so as to be rotatable therewith.

According to another embodiment of bolt or nut tightening device of the invention, the input means is a manual wrench, and an input receiver provided in the tightening assisting unit comprises a connecting member for detachably connecting an input shaft of a system for rotatingly driving the engaging portion of the tightening assisting unit to an output shaft of the manual wrench so as to be rotatable therewith and a one-way clutch attached to the tightening assisting unit for permitting the manual wrench to rotate in a desired direction but preventing the manual wrench from rotating in a direction opposite to the direction.

DETAILED DESCRIPTION OF THE INVENTION

The present invention will be described in detail with reference to the embodiments shown in the drawings.

First Embodiment

FIGS. 1 to 4

The illustrated bolt or nut tightening device comprises a tightening assisting unit 1 having an engaging portion 6 engageable with a bolt or nut, and input means 9 coupled to the unit 1.

The tightening assisting unit 1 comprises a planetary gear reduction assembly 2 provided inside a tubular casing 20 and having two output shafts and one input shaft, an outer shaft 4 and an inner shaft 3 which are coupled to the assembly 2 and projecting coaxially forward from the casing 20, the abovementioned engaging portion 6 projecting from the outer end of the inner shaft 3 and engageable with the bolt or nut (hereinafter referred to representatively as the "nut") to be tightened, an input receiver 8 for detachably coupling the input means 9 to the planetary gear reduction assembly 2, a tightening torque measuring unit 7 mounted on the outer shaft 4 for indicating tightening torque, and a reaction receiver 5 attached to the outer shaft 4.

Figure 2:
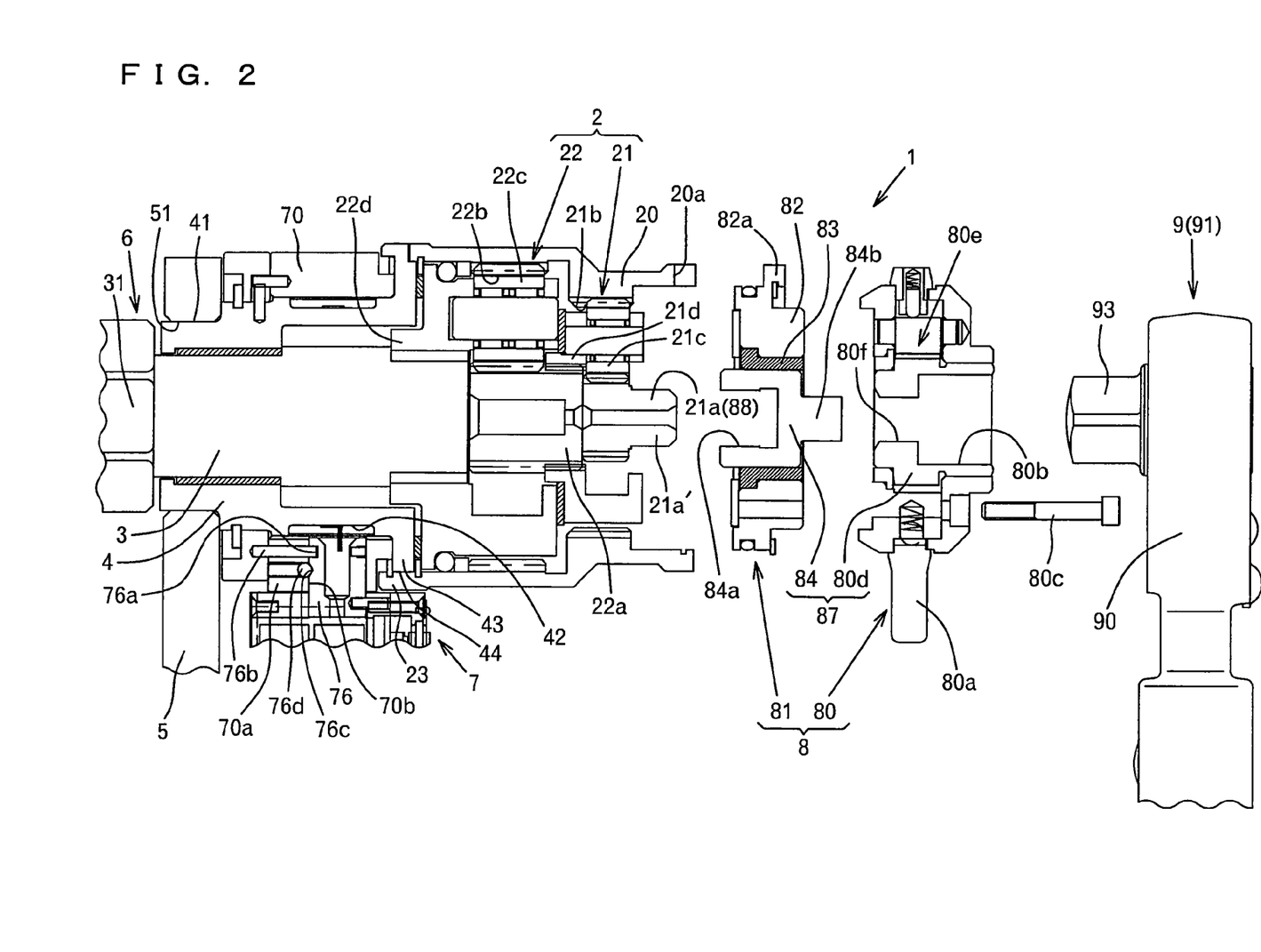
FIG. 2 is a sectional view of an input receiver of the tightening device and input means thereof as separated from the receiver.

With reference to FIG. 2, the planetary gear reduction assembly 2 comprises the combination of a first planetary gear mechanism 21 on an input side and a second planetary gear mechanism 22 on an output side.

The first planetary gear mechanism 21 comprises a first sun gear 21a, a first planetary gear 21c, a first inner gear 21b provided on the inner side of the casing 20 and a first planetary gear support frame 21d for rotatably supporting the first planetary gear 21c.

The second planetary gear mechanism 22 comprises a second sun gear 22a, a second planetary gear 22c, a second inner gear 22b provided on the inner side of the casing 20 and a second planetary gear support frame 22d for rotatably supporting the second planetary gear 22c.

The first and second sun gears 21a, 22a and the inner shaft 3 are positioned coaxially, the first planetary gear support frame 21d is in mesh with the second sun gear 22a, and the second planetary gear support frame 22d is in mesh with the inner shaft 3.

The first sun gear 21a is provided on its axis with an inward square shaft 21a', which serves as an input shaft 88 connectable to the input means 9.

When the input shaft 88 rotates clockwise (the direction in which right hand-threaded nuts are tightened), the inner shaft 3, i.e., the nut engaging portion 6, also rotates clockwise.

Figure 1:
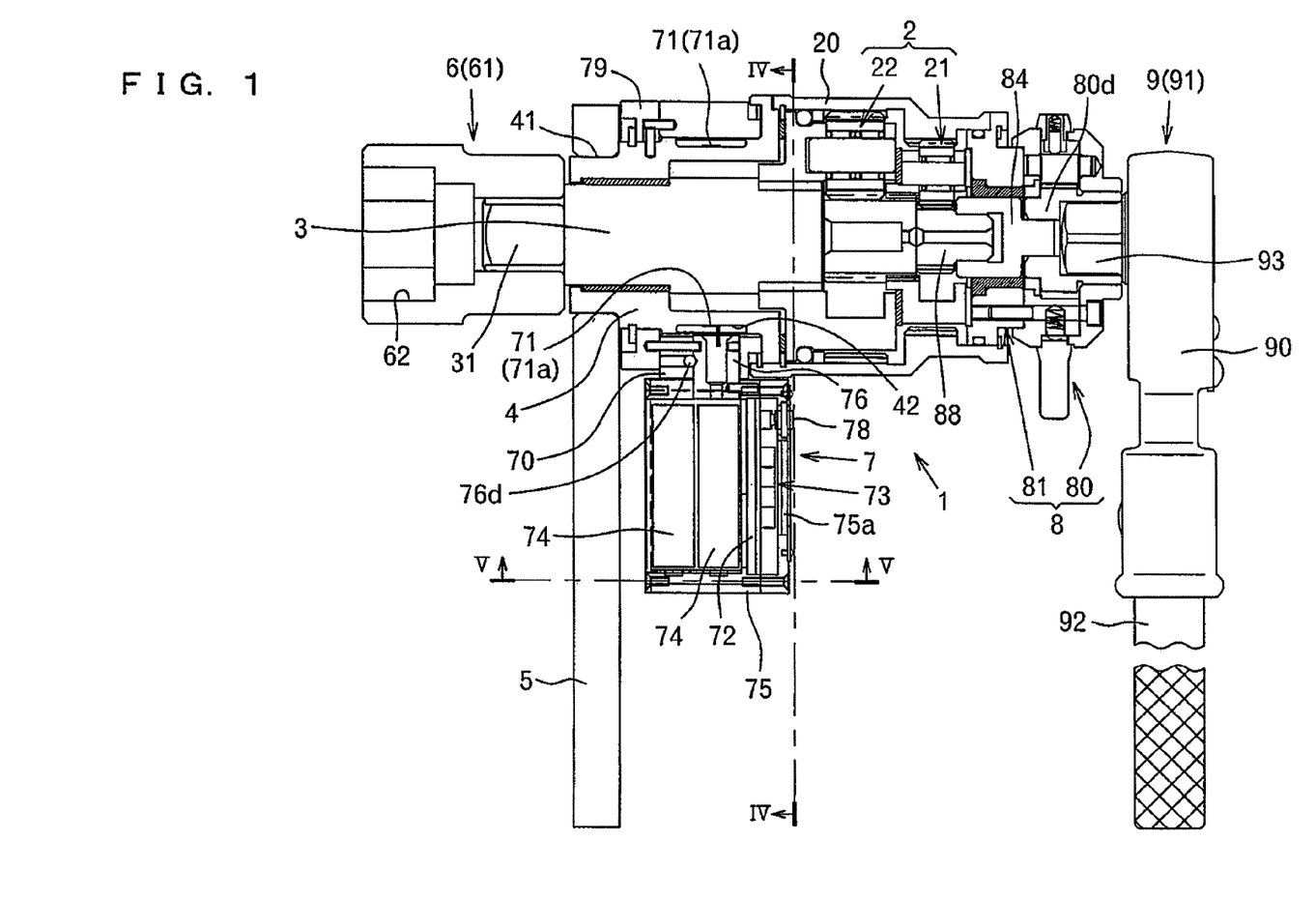
FIG. 1 is a sectional view of a tightening device of a first embodiment.

As shown in FIG. 1, the inner shaft 3 is provided at its forward end with a square shaft 31, and the engaging portion 6 is removably attached to the square shaft 31. The engaging portion 6 is a socket 61 having an engaging cavity 62 for the nut to be tightened to fit in.

Figure 3:
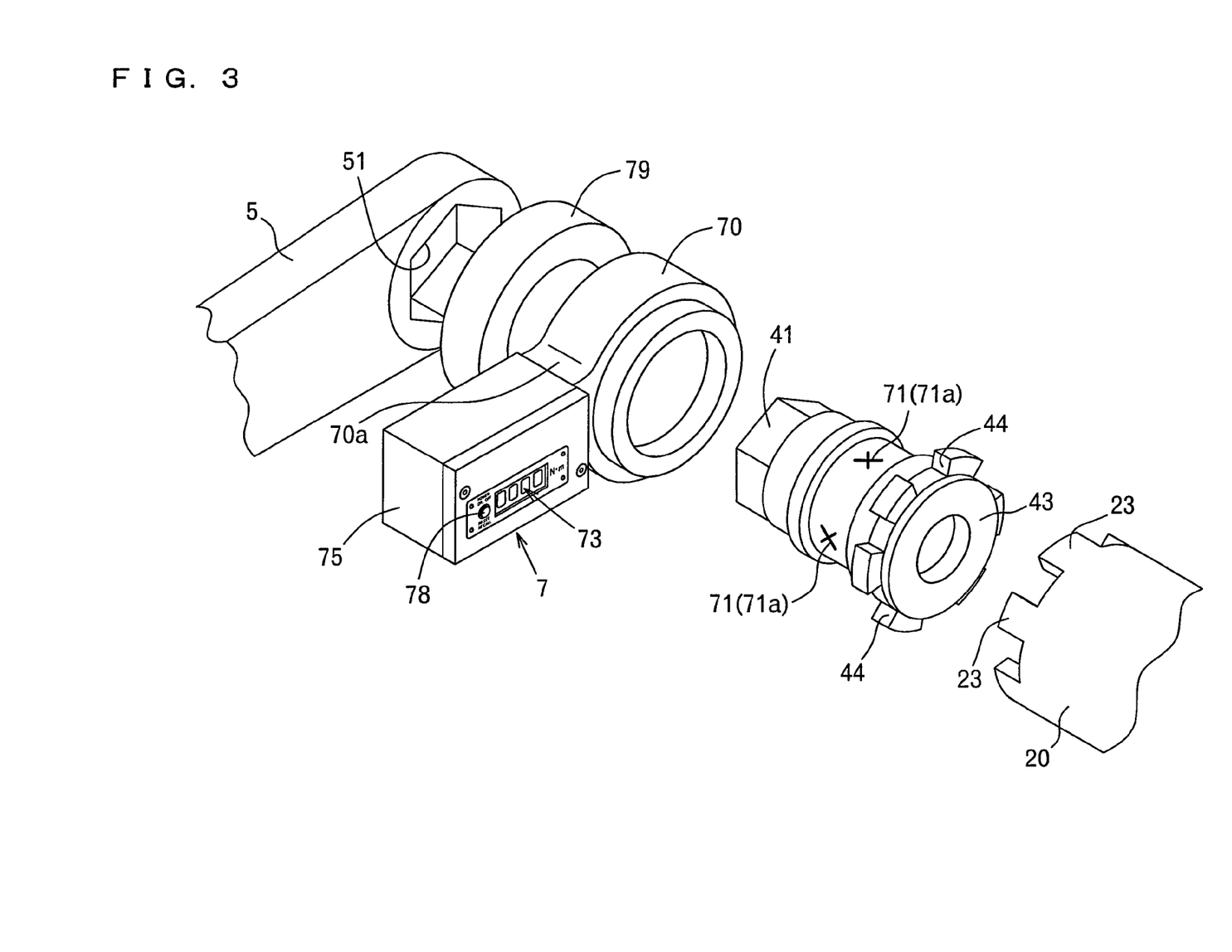
FIG. 3 is an exploded perspective view of a tightening assisting unit.
Figure 4:
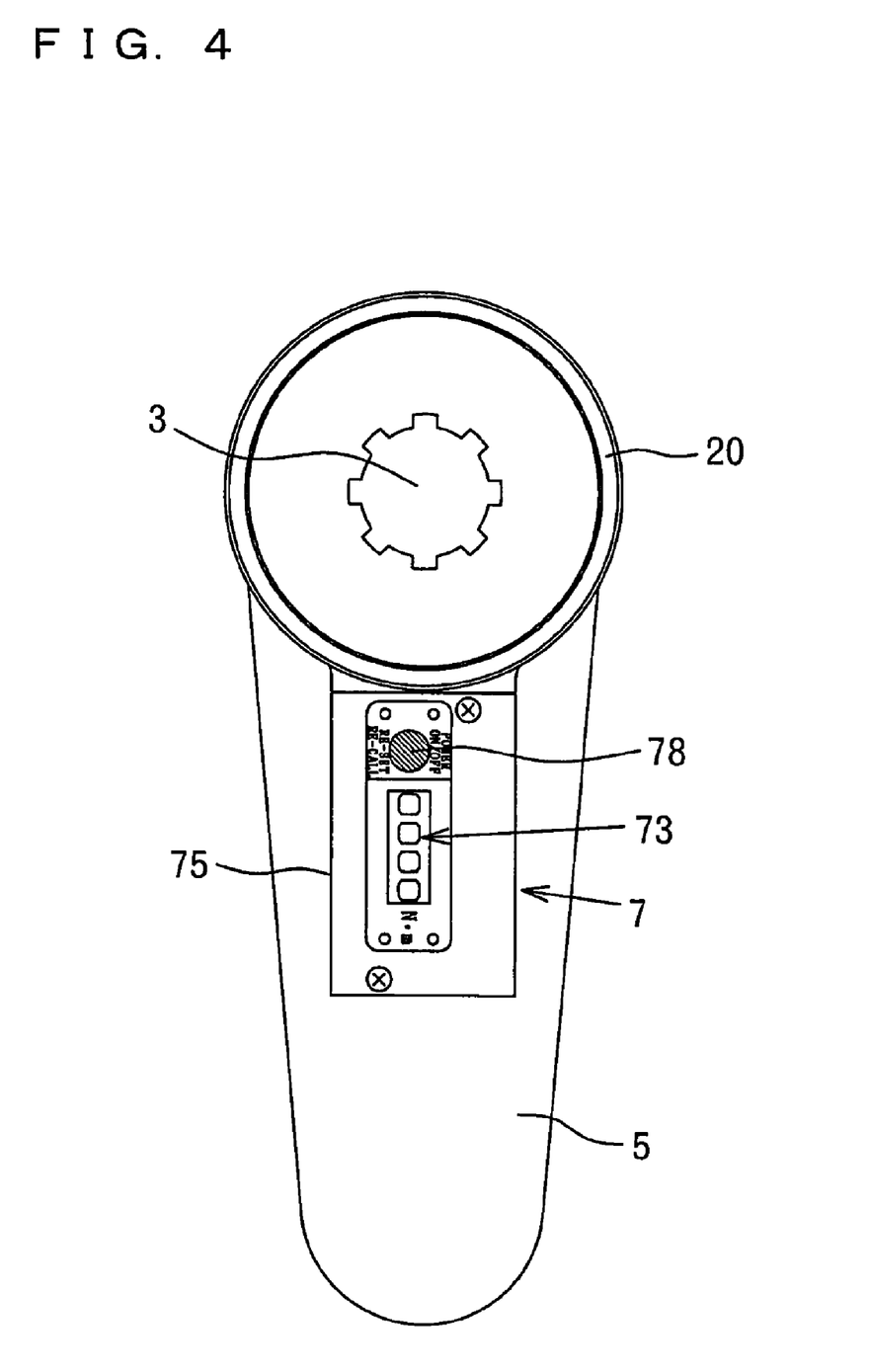
FIG. 4 is a view in section taken along the line IV-IV in FIG. 1.
Figure 5:
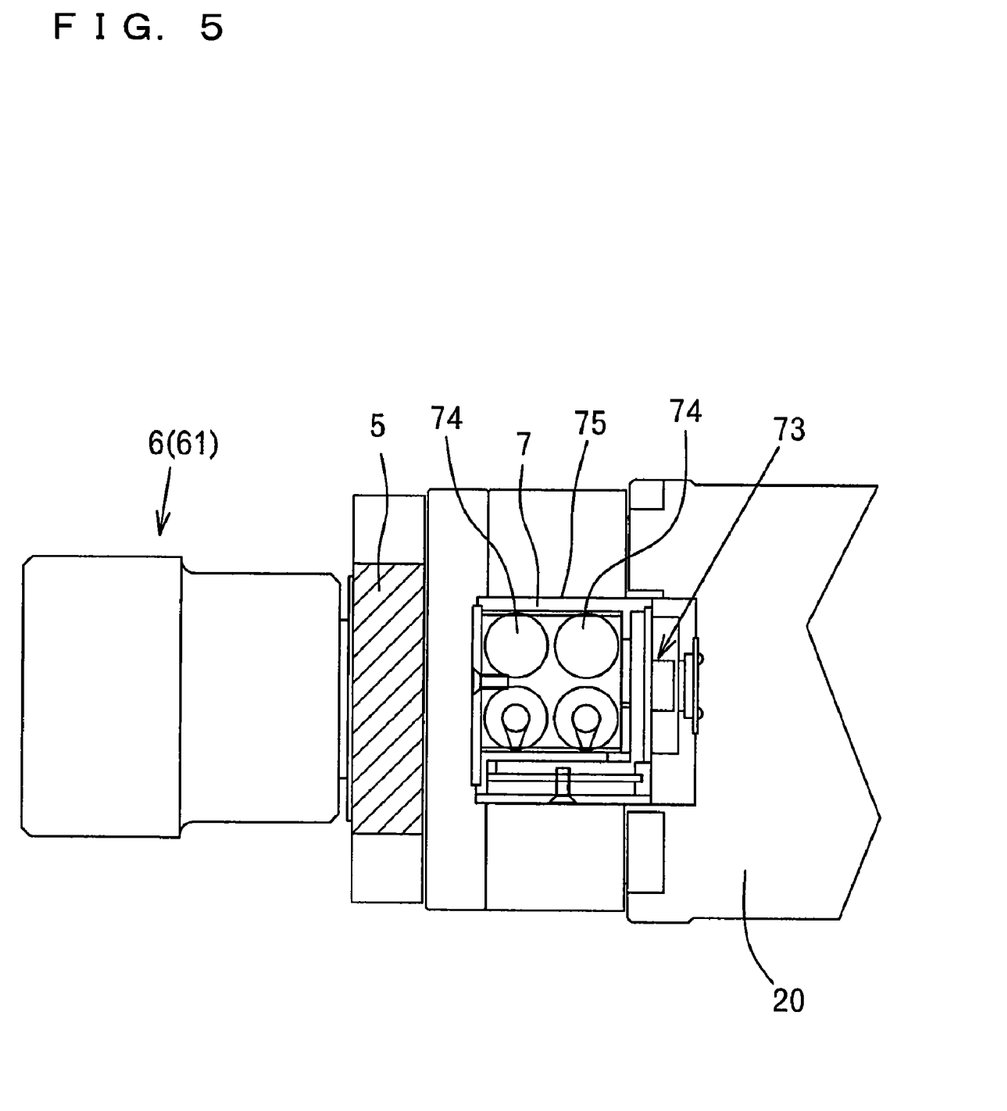
FIG. 5 is a view in section taken along the line V-V in FIG. 1.

With reference to FIGS. 2 and 3, the outer shaft 4 is in the form of a tubular body rotatably fitting around the inner shaft 3 and is provided with a peripheral wall 43 at one end of the casing 20. The peripheral wall 43 has a plurality of cutouts 44 formed in the outer periphery thereof and equidistantly arranged circumferentially thereof. A plurality of projections 23 extending from the end face of the casing 20 are engaged in the respective cutouts 44, whereby the casing 20 is joined to the outer shaft 4 so as to be rotatable therewith.

The outer shaft 4 has a furrow 42 formed in its outer surface circumferentially thereof at an intermediate portion of its length and is provided with an angular shaft portion 41 at its forward end.

The reaction receiver 5 is made from a thick metal plate having great rigidity, by cutting the plate into a piece having a length of about 25 cm. The reaction receiver 5 gradually decreases in width as its extends from a base end toward an outer end, and has a width of about 9 cm at its base end and a width of about 5 cm at its outer end. The receiver 5 has opposite circular-arc ends.

An angular hole 51 is formed in the base end portion of the reaction receiver 5, and the angular shaft portion 41 of the outer shaft 4 is tightly fitted in the hole 51. Accordingly, the reaction receiver 5 is positioned orthogonal to the axes of the inner and outer shafts 3, 4.

The tightening torque measuring unit 7 comprises a strain sensor 71a for detecting the strain of the outer shaft 4 while the nut is tightened, a circuit board 72 for converting the amount of strain of the sensor 71a to an amount of tightening torque, an indicator 73 for showing the amount of tightening torque, batteries 74, a case 75 for accommodating these components other than the strain sensor 71a, and amount tubular member 70 attached to and fitted around the outer shaft 4 for supporting the case 75.

The mount tubular member 70 is fitted around the outer shaft 4 to cover the furrow 42 therein and is held between the peripheral wall 43 of the outer shaft 4 and a retaining ring 79 mounted on the shaft 4 and positioned toward the engaging portion 6 so as to be rotatable with the outer shaft 4.

The mount tubular member 70 has a seat 70a protruding toward the direction in which the reaction receiver 5 extends. The case 75 is rotatably mounted on the seat 70a.

A case mount bore 70b is formed in the seat 70a in a direction orthogonal to the inner and outer shafts 3, 4.

The case 75 projects in the same direction as the reaction receiver 5.

The case 75 is in the form of a rectangular parallelepiped which is so sized as to be hidden by the contour of the reaction receiver 5, and is positioned as hidden behind the receiver 5 when seen from the front side of the engaging portion 6.

The case 75 has in the front wall thereof a front window 75a through which the indicator 73 can be seen, and an electric switch 78 is provided at one side of the window 75a.

The case 75 has a tubular rod 76 projecting from the center of one end thereof and rotatably fitting into the case mount bore 70b. The rod 76 has a circumferential groove 76a and cavities 76c arranged at equal intervals circumferentially thereof.

A pin 76b provided on the retaining ring 79 fits in the circumferential groove 76a for preventing the rod 76 from slipping off, i.e., preventing the case 75 from slipping off from the mount tubular member 70.

A click ball 76d provided on the retaining ring 79 and biased by a spring fits in the cavity 76c to softly engaging the rod 76.

According to the present embodiment, the case 75, as positioned with its window 75a facing toward a direction opposite to the reaction receiver 5, is rotatable through 180 deg about this position around half of the circumference of the rod 76.

The cavities 76c in the rod 56 are arranged at five locations at intervals of 45 deg about the axis of the rod so as to render the case 75 rotatable through 45 deg at a time.

The case 75 as rotatably supported by the rod 76 on the seat 70a is positioned in the closest proximity to the reaction receiver 5.

As shown in FIG. 3, the strain sensors 71a of the present embodiment are strain gauges 71 affixed to the furrowed portion 42 of the outer shaft 4. The strain gauge 71 is in an X shape and affixed to each of four locations on the outer shaft 4 which are equidistantly spaced apart circumferentially thereof.

The strain gauges 71 are electrically connected to the circuit board 72 inside the case 75 by conductive wires (not shown) extending through the tubular rod 76.

The circuit board 72 is positioned at the side of the window 75a of the case 75, and the indicator 73 is disposed between the window 75a and the circuit board 72.

The strain gauges 71 at the four locations on the outer shaft 4 provide a bridge circuit (not shown) on the circuit board 72. The indicator 73 shows a tightening torque value corresponding to the average of amounts of strain at the four locations on the outer shaft 4 where the strain gauges 71 are affixed.

The indicator 73 of the present embodiment provides a four-digit LED display. The display comprises the digits of a numerical value as arranged in the length of the case 75. The batteries 74 are placed in the case 75 between the rear wall thereof and the circuit board 72.

When the switch 78 on the front wall of the case 75 is pushed, the circuit board 72 is energized. If the circuit board 72 remains inoperative for a predetermined period of time, the circuit board 72 is automatically deenergized to prevent useless consumption of the battery power.

The input means 9 is a manual wrench 91, which has a handle 92 and an output shaft 93 in the form of a square shaft and provided at the head 90 of the handle 92 orthogonal to the handle 92.

By virtue of a ratchet mechanism (not shown) incorporated in the head 90, the output shaft 93 transmits the rotation in one direction of the handle but idly rotates in the opposite direction.

The input means 9 is detachably connected to the tightening assisting unit 1 by an input receiver 8 of the unit. The input receiver 8 comprises a lid assembly 81 for closing an input-side opening of the casing 20, and a one-way clutch 80 as seen in FIG. 1.

The lid assembly 81 comprises a lid body 82, and a coupling 84 rotatably provided in the center of the lid body 82 with a bearing sleeve 83 interposed therebetween.

The lid body 82 is provided on its outer periphery with projections 82a equidistantly arranged circumferentially thereof and fitted in respective cutouts 20a formed in an end face of the casing 20, whereby the lid body 82 is attached to the casing 20.

The coupling 84 has a square bore 84a formed in one side thereof opposed to the input shaft 88, in the form of a square rod, of the tightening assisting unit 1 for the input shaft 88 to fit in. The coupling 84 has a square shaft 84b projecting from the other side thereof opposite to the bore 84a.

The one-way clutch 80 is fixed to the lid assembly 81 with a bolt 80c and has on its axis a socket member 80d which is allowed to rotate only in one direction by a ratchet mechanism 80e. The direction of rotation of the socket member 80d allowed by the ratchet mechanism 80e can be changed over by manipulating a change lever 80a.

Formed in the socket member 80d in alignment with its axis are a square hole 80f for the square shaft 84b of the lid assembly 81 to fit in, and a square hole 80b for the output shaft 93 of the manual wrench 91 to engage in.

The socket member 80d and the coupling 84 provide a connecting member 87 for detachably connecting the input shaft 88 of the system for rotatingly driving the engaging portion 6 of the tightening assisting unit 1 to the output shaft 93 of the manual wrench so as to be rotatable therewith.

As shown in FIG. 1, the output shaft 93 of the manual wrench 91 is coupled to the input shaft 88 of the planetary gear reduction assembly 2 by the socket member 80d of the one-way clutch 80 and the coupling 84 of the lid assembly 81 to provide a tightening device.

The circuit board 72 is energized by pushing the switch 78 of the tightening torque measuring unit 7.

With a nut engaged in the socket 61, the reaction receiver 5 is caused to bear on a projecting article in the vicinity of the nut.

The manual wrench 91 is rotated in the nut tightening direction, and then rotated reversely. When repeated, this reciprocating movement rotates the output shaft 93 of the manual wrench 91 only in the nut tightening direction by virtue of the ratchet mechanism of its own and the one-way clutch 80, rotating the input shaft of the tightening assisting unit 1 in the same direction. The rotation of the input shaft 88 is subjected to speed reduction and power increase by the planetary gear assembly 2 to rotate the socket 61 and tighten up the nut.

The reaction of tightening is received at this time by the projecting article in the vicinity of the nut through the reaction receiver 5, so that the casing 20 of the gear assembly 2 and the output shaft 4 remain unrotated.

The amount of strain of the outer shaft 4 is detected by the strain gauges 71 at the four locations on the outer shaft 4 which are equidistantly spaced apart circumferentially thereof, and the average stain value is indicated as tightening torque by the indicator 5.

Among the components of the tightening torque measuring unit 7, the bulky components, i.e., the circuit board 72, indicator 73 and batteries 74, are accommodated in the case 75, which is caused to project from the outer shaft 4 in the same direction as the reaction receiver 5. Although the device becomes locally projected outward greatly due to the presence of the case 75, the present device need not use a large tubular casing of increased rigidity as a shell for protecting the components unlike the tightening torque measuring unit of the aforementioned patent publication. The measuring unit 7 is therefore small-sized and made lightweight in its entirety.

Since the case 75 projects from the outer shaft 4 sideways, the case 75 appears susceptible to the impact to be involved when the case strikes against the projecting article for the reaction receiver 5 to bear on, workpiece or others. However, the case 75 is so sized and positioned as to be hidden behind the reaction receiver 5 having great rigidity and to be subjected to the tightening reaction. The workpiece or the like is therefore prevented from striking directly against the case to obviate the likelihood of the measuring unit 7 becoming broken.

Further when the tightening assisting unit 1 is placed on the floor, the reaction receiver 5 will come into contact with the floor to hold the case raised from the floor. This eliminates the likelihood that the load of the tightening assisting unit 1 will act on the case 75. In this respect, the case 75 will be protected also by the reaction receiver 5.

Due to the tightening reaction to be exerted by the projecting article in the vicinity of the nut through the reaction receiver 5, the four strain gauges 71 become different in the amount of strain although slightly. The amount of strain is measured by the strain gauges 71 arranged at the four locations as described above, and the average value of measured strain is indicated. This assures measurement with improved reliability.

On the case 75 projecting from the outer shaft 4 in a direction orthogonal to the axis thereof, the indicator 73 shows the digits of a numerical value as arranged along the direction of projection of the case, so that indicator 73 can be easily read by the worker using the manual wrench.

Because the case 75 is rotatable about the rod 76 orthogonal to the axis of the outer shaft 4, the indicator can be positioned at an altered angle ensuring ease of reading.

Even if torsion acts on the tightening assisting unit 1 when the nut is tightened, elastically deforming the unit 1 in its entirety in the direction of torsion, the handle 92 will not rotate in a direction opposite to the tightening direction in corresponding relation with the resulting elastic restoration, since the one-way clutch 80 is provided in the input receiver 8.

If the disadvantage of permitting slight reverse rotation of the handle due to the torsional elastic restoration of the tightening assisting unit 1 is considered acceptable, the coupling 84 of the lid assembly 91 may be so designed as to connect the input shaft 88 of the unit 1 to the output shaft 93 of the manual wrench. The one-way clutch 80 can then be dispensed with.

Second Embodiment

Figure 6:
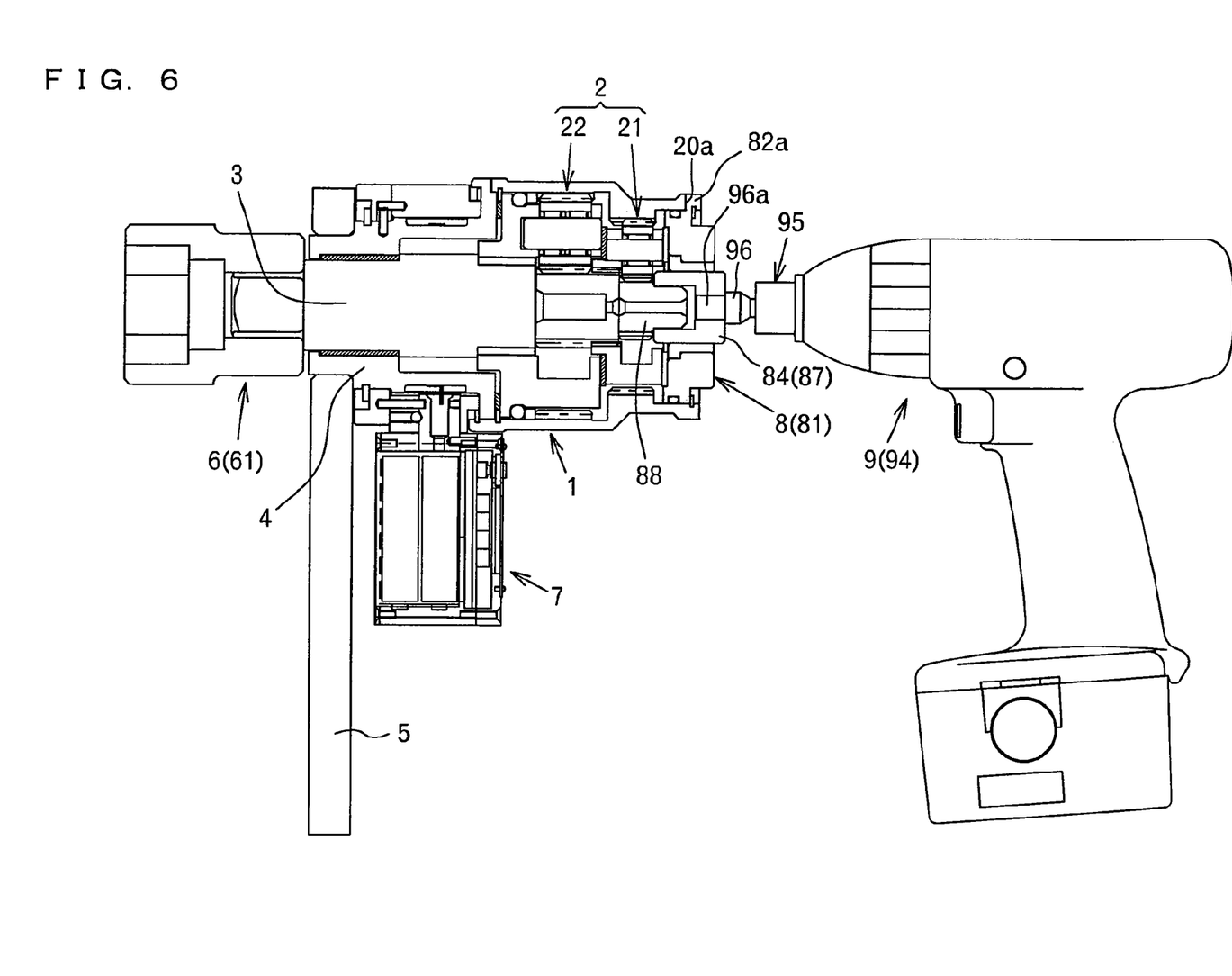
FIG. 6 is a sectional view of a tightening device of a second embodiment.
Figure 7:
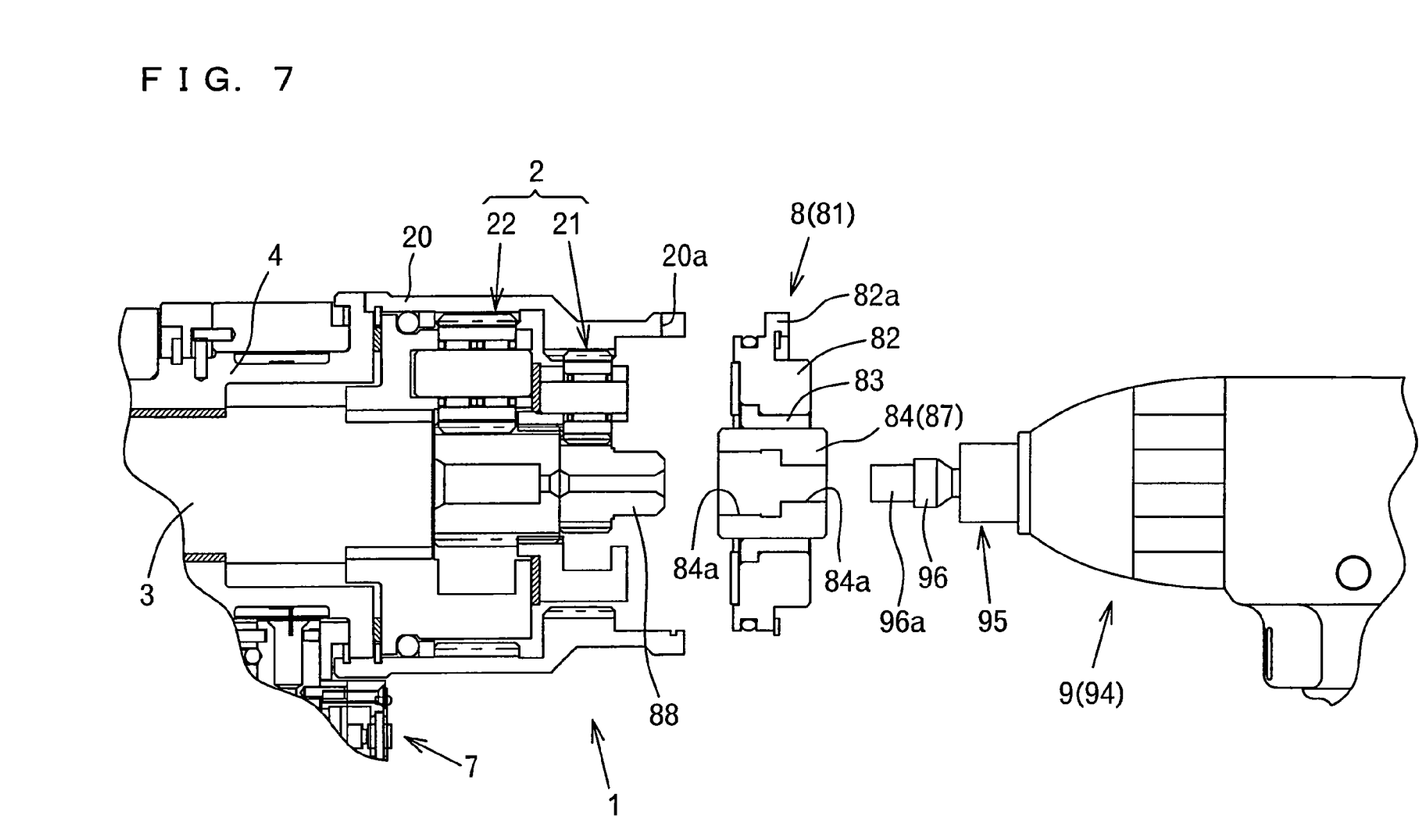
FIG. 7 is a sectional view of an input receiver of the tightening device and input means thereof as separated from the receiver.

FIGS. 6 and 7

The second embodiment differs from the first with respect to the input means 9 and the input receiver 8 of the tightening assisting unit 1, but is otherwise the same as the first, so that the same construction will not be described repeatedly.

The input means 9 of this embodiment is a power tightening machine 94 having a single output shaft. Although not great in output torque, the machine is usable for a wide variety of work with a bit, socket or like output shaft 96 attached to the rotational drive shaft 95 thereof, is inexpensive and has a multiplicity of uses.

According to the present embodiment, the output shaft 96 of the power tightening machine 94 has a square shaft 96a at its forward end.

The tightening assisting unit 1 has an input receiver 8, which is a lid assembly 81 fitting in the input-side opening of the casing 20. The lid assembly 81 comprises a coupling 84 rotatably provided in a lid body 82 on its axis, with a bearing sleeve 83 interposed therebetween.

The coupling 84 has a square bore 84a formed in one end thereof opposed to the input shaft 88 of the tightening assisting unit 1 for the input shaft 88 to engage in, and a square bore 84a formed in the other end thereof for the square shaft 96a of the machine 94 to engage in.

The coupling 84 provides a second connecting member 87 for detachably connecting the input shaft 88 of the system for rotatingly driving the engaging portion 6 of the tightening assisting unit 1 to the output shaft 96 of the power tightening machine so as to be rotatable therewith.

According to the second embodiment, the tightening assisting unit 1 has the same advantages as already described with reference to the first embodiment.

According to the second embodiment, an input can be given to the tightening assisting unit 1 by the power tightening machine 94 having a single output shaft.

Although not great in torque, the power tightening machine 94 is inexpensive as such, lightweight, easy to use and therefore suitable for common uses.

The insufficiency of the input torque given by the power tightening machine 94 can be compensated for by the speed reduction and power increase by the planetary gear reduction assembly 2 incorporated in the tightening assisting unit 1.

Third Embodiment

Figure 8:
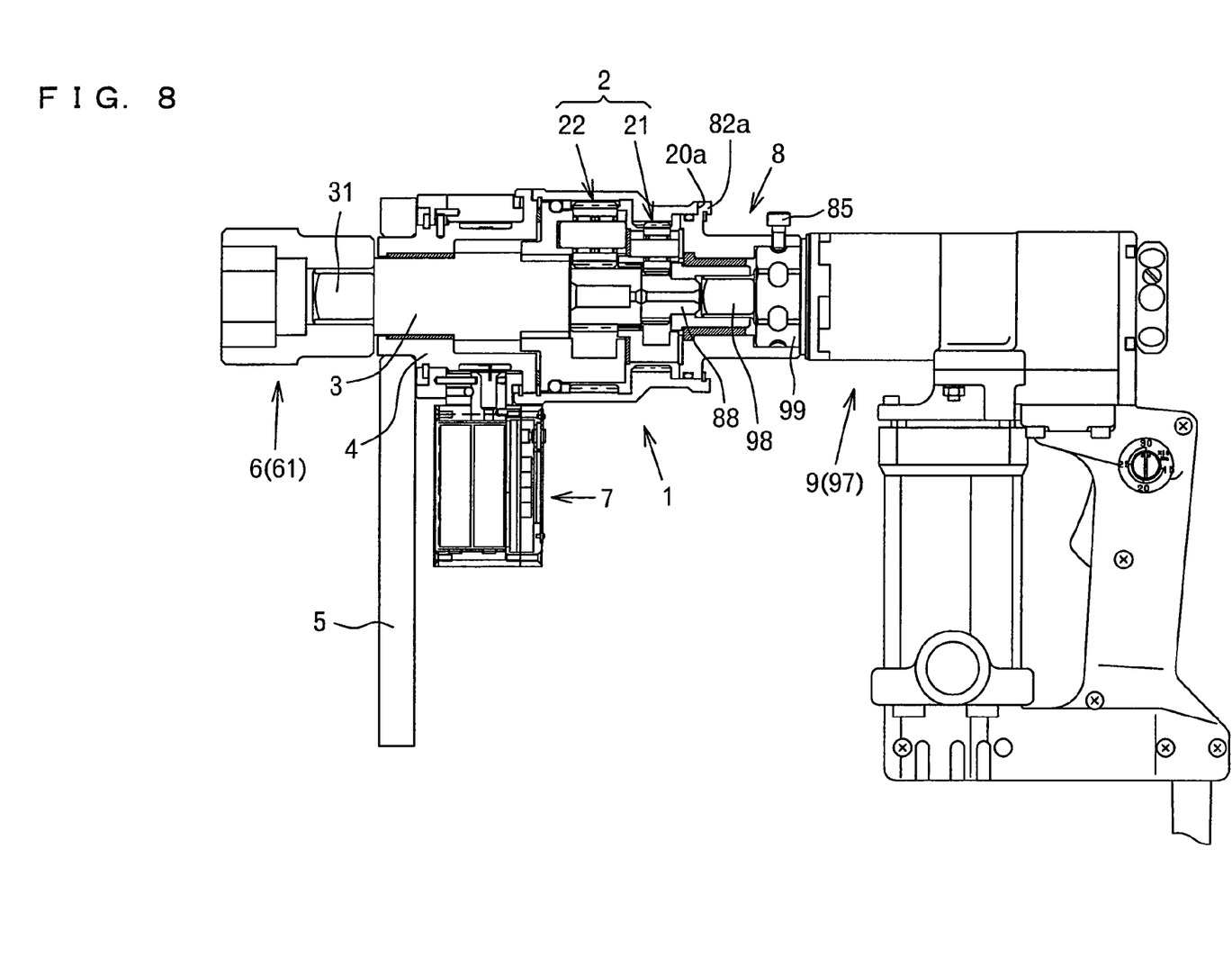
FIG. 8 is a sectional view of a tightening device of a third embodiment.
Figure 9:
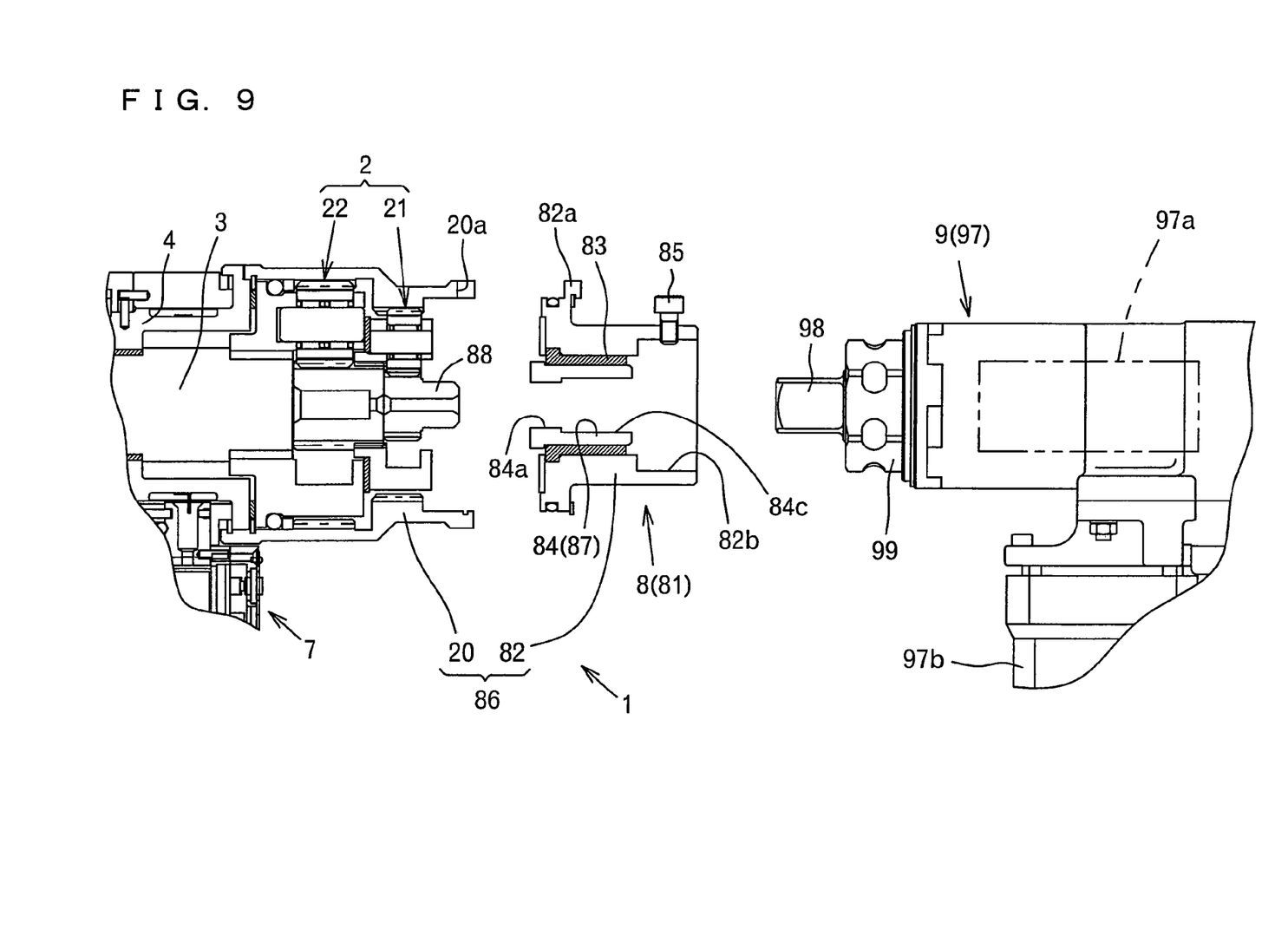
FIG. 9 is a sectional view of an input receiver of the tightening device and input means thereof as separated from the receiver.

FIGS. 8 and 9

This embodiment differs from the first with respect to the input means 9 and the input receiver 8 of the tightening assisting unit 1.

The construction of this embodiment in common with that of the first will not be described repeatedly.

The input means 9 is a known power tightening machine having two output shafts, called a nut runner and driven by an electric motor 97b. The input means 9 comprises a reduction power mechanism 97a provided by planetary gears, and has an inner output shaft 98 and an outer output shaft 99 coaxial therewith.

The tightening assisting unit 1 has an input receiver 8, which is a lid assembly 81 fitting in an input-side opening of the casing 20. The lid assembly 81 has a coupling 84 provided in a tubular lid body 82 at one side thereof opposed to the input shaft 88 and positioned on the axis of the lid body, and has a square bore 82b in the other side thereof for the outer output shaft 99 of the machine 97 to fit in.

The coupling 84 is freely rotatably mounted in the lid body 82 with a bearing sleeve 83 interposed therebetween and has a square bore 84a at one side thereof close to the input shaft 88 for the shaft to fit in and a square bore 84c at the other side thereof for the inner output shaft 98 of the machine 97 to fit in.

The lid assembly 81 has projections 82a engaged in respective cutouts 20a of the casing 20. The lid body 82 and the casing 20 provide a first connecting member 86 for detachably connecting the outer output shaft 99 of the power tightening machine 97 to the outer shaft 4 of the tightening assisting unit 1 so as to be rotatable therewith.

The lid body 82 has a clamp bolt 85 for fixing the outer output shaft 99 of the machine 97 as fitted in the square bore 82b.

The coupling 84 serves as a second connecting member 87 for detachably connecting the inner output shaft 98 of the power tightening machine 97 to the input shaft 88 of the system for rotatingly driving the engaging portion 6 of the tightening assisting unit 1 so as to be rotatable therewith.

According to the third embodiment, the tightening assisting unit 1 has the same advantages as already described with reference to the first embodiment.

According to the third embodiment, an input can be given to the tightening assisting unit 1 by the power tightening machine 97 having two output shafts.

The power tightening machine 97 having two output shafts is capable of tightening up the nut with greater torque than the power tightening machine 94 of the second embodiment having a single output shaft. Nuts can therefore be tightened up with greater torque also because of the speed reduction and power increase of the planetary gear assembly 2 incorporated in the tightening assisting unit 1.

ADVANTAGES OF THE INVENTION

The tightening torque measuring unit 7 of the bolt or nut tightening device of the invention is so adapted that among the components of this unit, the bulky components, i.e., the circuit board 72, indicator 73 and batteries 74, are accommodated in the case 75, which is caused to project from the outer shaft 4 in the same direction as the reaction receiver 5. Although the device becomes locally projected outward greatly due to the presence of the case 75, the present device need not use a large tubular casing of increased rigidity as a shell for protecting the components unlike the tightening torque measuring unit of the aforementioned patent publication, The measuring unit 7 is therefore small-sized and made lightweight in its entirety.

Since the case 75 projects from the outer shaft 4 sideways, the case 75 appears susceptible to the impact to be produced by the striking contact of a workpiece or the like. However, the reaction receiver 5 having great rigidity is positioned closer to the nut engaging portion 6 than the case 75, which is so sized as to be hidden by the contour of the reaction receiver 5. A projecting article or the like for the reaction receiver 5 to bear on is therefore prevented from directly striking against the case to obviate the likelihood of the tightening torque measuring unit 7 becoming broken.

Further when the tightening assisting unit 1 is placed on the floor, the reaction receiver 5 will come into contact with the floor to hold the case raised from the floor. This eliminates the likelihood that the load of the tightening assisting unit 1 will act on the case 75. In this respect, the case 75 will be protected also by the reaction receiver 5.

Since the tightening assisting unit 1 can be made small-sized and lightweight as described above, the bolt or nut tightening device including the input means 9 can also be made smaller and lightweight in its entirety and is therefore highly maneuverable and easy to use.

The indicator 73 shows the digits of a tightening torque numerical value as arranged along the direction of projection of the case 75, so that the numerical value can be easily read by the worker using the input means 9.

Because the case 75 is rotatable about the rod orthogonal to the axis of the outer shaft 4, the case can be tilted by rotation for the worker to read the numerical value on the indicator 73 with greater ease.

When the input means 9 is the power tightening machine 97 having two output shafts, a planetary gear mechanism can be incorporated into the structure of the machine to afford greater torque for tightening, with the result that the speed reduction and power increase operation of the planetary gear reduction assembly 2 incorporated in the tightening assisting unit 1, as added to the operation of this mechanism, ensures a tightening operation with increased torque.

When the input means 9 is the power tightening machine 94 having a single output shaft, the torque available is not great, but the tightening machine is inexpensive, lightweight, easy to use and is therefore suited to common uses. The insufficient torque afforded by the power tightening machine 94 having a single output shaft can be compensated for by the planetary gear reduction assembly 2 incorporated in the tightening assisting unit 1.

Although a great output is not available when the manual wrench 91 is used as the input means 9, the deficiency can be compensated for by the speed reduction and power increase of the planetary gear reduction assembly 2 included in the unit 1. When tightening the nut, the tightening assisting unit 1 is subjected to torsion and elastically deforms in its entirety in the direction of torsion, such that the moment the handle is returned in the opposite direction after having been rotated in the tightening direction, the unit 1 elastically recovers from the torsion, permitting the handle to rotate in a direction opposite to the tightening direction in corresponding relation with the elastic recovery, hence the problem that even if the handle is reciprocatingly rotated, the rotation corresponding to the amount of torsional elastic deformation fails to act for tightening. However, the one-way clutch 80, if provided as already described, precludes the reverse rotation of the handle due to the elastic recovery of the unit 1 from the torsion. Accordingly, the rotational angle of the handle can be made to correspond to the actual angle of tightening.

The embodiments described above are intended to illustrate the present invention and should not be construed as limiting the invention set forth in the appended claims or reduce the scope of the invention. The device of the invention is not limited to the foregoing embodiments in construction but can be modified variously within the technical scope as set forth in the claims.

For example, the strain sensors 71a for detecting the amount of strain of the outer shaft 4 while the nut is tightened can be of any type, such as magnetostrictive strain sensors, insofar as the sensors can be provided on the outer shaft 4 without making the tightening torque measuring unit 7 noticeably greater.

What is claimed is:

1. A bolt or nut tightening device comprising the combination of a tightening assisting unit having an outer shaft and an inner shaft coupled to a planetary gear mechanism coaxially therewith and rotatable in directions opposite to each other, the outer shaft having a reaction receiver projecting therefrom sideways, the inner shaft being provided with an engaging portion engageable with a bolt or nut to be tightened, and input means coupled to the planetary gear mechanism, the outer shaft being provided with a tightening torque measuring unit, the tightening torque measuring unit comprising a strain sensor provided on the outer shaft, a circuit board for converting the amount of strain of the outer shaft as detected by the strain sensor to an amount of tightening torque, an indicator for indicating the amount of tightening torque, a battery, and a case for accommodating the circuit board, the indicator and the battery, the case being attached to the outer shaft and projecting toward the same direction as the reaction receiver, the case being so sized as to be hidden by a contour of the reaction receiver and being so positioned as to be hidden behind the reaction receiver when seen from the forward end side of the engaging portion; wherein the case is rotatable about a rod orthogonal to an axis of the outer shaft.

2. The bolt or nut tightening device according to claim 1 wherein the indicator is located orthogonal to the outer shaft.

* * * * *